(12) United States Patent  
Ernst

(10) Patent No.: US 8,984,317 B2  
(45) Date of Patent: Mar. 17, 2015

(54) METHOD AND ARRANGEMENT FOR SAVING ENERGY IN MICROPROCESSORS

(75) Inventor: Edmund Ernst, Munich (DE)

(73) Assignee: Unify GmbH & Co. KG, Munich (DE)

( * ) Notice: Subject to any disclaimer, the term of this patent is extended or adjusted under 35 U.S.C. 154(b) by 671 days.

(21) Appl. No.: 13/120,529

(22) PCT Filed: Sep. 29, 2009

(86) PCT No.: PCT/EP2009/007003  
§ 371 (c)(1),  
(2), (4) Date: Mar. 31, 2011

(87) PCT Pub. No.: WO2010/037524  
PCT Pub. Date: Apr. 8, 2010

(65) Prior Publication Data  
US 2011/0185210 A1 Jul. 28, 2011

(30) Foreign Application Priority Data  
Sep. 30, 2008 (DE) .......................... 10 2008 049 714

(51) Int. Cl.  
*G06F 1/00* (2006.01)  
*G06F 1/32* (2006.01)

(52) U.S. Cl.  
CPC ............ *G06F 1/3203* (2013.01); *G06F 1/3287* (2013.01); *Y02B 60/1278* (2013.01); *Y02B 60/1282* (2013.01)  
USPC ............ 713/324; 713/300; 713/320; 713/322

(58) Field of Classification Search  
USPC .................. 713/300, 320, 322, 324  
See application file for complete search history.

(56) References Cited

U.S. PATENT DOCUMENTS

| 5,199,052 | A | * | 3/1993 | Fujita ............................. 377/20 |
| 5,964,879 | A | | 10/1999 | Dunstan et al. |
| 7,496,775 | B2 | * | 2/2009 | Ono .............................. 713/323 |
| 7,734,941 | B2 | * | 6/2010 | Khodorkovsky et al. ..... 713/323 |
| 2004/0028070 | A1 | | 2/2004 | Barr et al. |
| 2004/0236969 | A1 | * | 11/2004 | Lippert et al. ................ 713/300 |
| 2007/0076498 | A1 | | 4/2007 | Ho et al. |

(Continued)

FOREIGN PATENT DOCUMENTS

| CN | 1908844 A | 2/2007 |
| DE | 3929236 A1 | 2/1991 |
| EP | 0522720 A1 | 1/1993 |

OTHER PUBLICATIONS

Written Opinion of the International Searching Authority for PCT/EP2009/007003 dated Apr. 1, 2010 (Form PCT/ISA/237) (German Translation).

(Continued)

*Primary Examiner* — Michael J Brown  
(74) *Attorney, Agent, or Firm* — Buchanan Ingersoll & Rooney PC

(57) ABSTRACT

The invention relates to a method for operating an electronic system, wherein the energy consumption of at least parts of the system is regulated such that on the basis of at least a time-related curve of the current (IFE1, . . . , IFEn) detected within the system, a gradient value (diFE1, . . . , diFEn) of the current value generated at least partially from circuitry is formed. On the basis of the gradient value, a circuit-related manipulation of at least one physical variable of the system is carried out. The invention further relates to an arrangement for carrying out the method.

20 Claims, 2 Drawing Sheets

(56) References Cited

U.S. PATENT DOCUMENTS

2007/0088962 A1    4/2007  Yu
2008/0012585 A1*   1/2008  Chung et al. .................. 324/713
2008/0208489 A1*   8/2008  Cox ............................... 702/57

OTHER PUBLICATIONS

Written Opinion of the International Searching Authority for PCT/EP2009/007003 dated Apr. 1, 2010 (Form PCT/ISA/237) (English Translation).

International Preliminary Report on Patentability for PCT/EP2009/007003 dated Apr. 5, 2011 (Form PCT/IB/373, PCT/ISA/237) (German Translation).

International Preliminary Report on Patentability for PCT/EP2009/007003 dated Apr. 5, 2011 (Form PCT/IB/373, PCT/ISA/237) (English Translation).

International Search Report of PCT/EP2009/007003 dated Apr. 1, 2010 (English).

International Search Report of PCT/EP2009/007003 dated Apr. 1, 2010 (German).

* cited by examiner

METHOD AND ARRANGEMENT FOR SAVING ENERGY IN MICROPROCESSORS

CROSS-REFERENCE TO RELATED APPLICATIONS

This application is the U.S. national phase under 35 U.S.C. §371 of PCT International Application No. PCT/EP2009/007003, filed on Sep. 29, 2009 and claiming priority to German application no. 10 2008 049 714.2, filed on Sep. 30, 2008.

BACKGROUND OF THE INVENTION

1. Field of the Invention

Embodiments relate to a method for operating an electronic system to optimize energy use and an arrangement for operating an electronic system to optimize energy use.

2. Background of Related Art

Energy production and use are increasingly being addressed, not only due to the cost, but recently also in the context of discussions about global warming and generally about the efficient use of resources.

This in the meantime has also led to legal regulations, but also to a change in purchasing behavior which further requires optimization of energy requirements.

For this reason, the issue of energy savings has become increasingly important with regard to communication systems as well, in particular for devices in this field with power cords.

A number of methods are currently used to optimize the energy use of an electronic system, using primarily the following approaches:

A first approach involves, for a system based on multiple at least partially independent subsystems, having only the subsystems that are needed at any given point in time be active, so that, for example, data interfaces and man-machine interfaces are operational only during corresponding data transfers or certain operating modes, and having this also apply to central processing units (CPU). This approach is also known as "sleep mode" or "idle mode."

Another approach consists of having the system or the respective subsystem, especially for CPUs and similar units, be operational depending on load using a power supply suitable for its particular operating status. This approach uses the known fact that energy use for this type of implementation relates most proportionally to pulse frequency, as published in DE 692 29 819 T2, US 2007/0 076498 A1, and US 2007/0 088962 A1. The disadvantage here is that a pulse reduction naturally causes correspondingly worsened (computer) performance.

This process is therefore applied primarily when, due to dynamic system requirements such as those imposed by a so-called "refresh" or reawakening procedure, it is not possible to completely deactivate the system.

A critical point of these approaches lies in determining relevant indicators that make it possible to put the respective system into one of the operating statuses described above and also to bring it back to normal status when needed and in an appropriate length of time.

This is normally accomplished using a suitable software implementation, which is aware of the current operating status by means of a so-called "scheduler," for example, and uses this knowledge to control and/or adjust the energy saving operating status.

BRIEF SUMMARY OF THE INVENTION

It would be desirable to provide an arrangement and a method for improving the aforementioned optimization of electronic devices, in particular devices related to communication technology.

According to an embodiment of the invention the energy consumption, specifically the electrical power consumption, of at least parts of the system is regulated such that, by means of at least one time-related current curve detected within the system, a gradient value of the current value is generated at least partially from circuitry and, based on that gradient value, circuit-related manipulation of at least one physical variable takes place.

One advantage of the invented method lies in the fact that it is possible to reduce power consumption using circuitry almost exclusively, because current intake is used as the indicator. The invention also applies the knowledge that, with increasing activity of an electronic system and otherwise constant switching parameters, the current requirement, and with it the amount of energy consumed, increases. The slope (gradient) of the current can therefore be used, for the invention, as the indicator for the activity curve of an electronic system.

The invention is preferably expanded advantageously such that manipulation involves the adjustment of at least one pulse signal of the system, because in this way a higher pulse frequency is provided for positive gradients and the resulting increased activity of the manipulated circuit, while for decreasing activity, indicated by a negative gradient, pulse frequency and therefore power consumption can be reduced.

A contribution toward executing the method using circuitry as much as possible is therefore advantageously made by having the current curve be directed through an analog-digital converter "A/D converter" such that the outgoing signal from the A/D converter is used to generate the gradient value.

This contribution is further enhanced if the invention is expanded such that manipulation, especially pulse signal adjustment, is initiated by a "Field-Programmable Gate Array" FPGA. This also allows for more flexibility, because the array's programmability guarantees a greater degree of freedom in both implementation and execution of the method.

Preferably, in the case of a pulse signal adjustment made by the FPGA, the FPGA forwards the pulse signal as an outgoing signal from the FPGA to the system. Here the pulse signal adjustment is accomplished using a circuitry element that offers the aforementioned additional degree of freedom and for which the possibility of integration and therefore space savings is available. In addition, FPGAs are widely available and therefore can be acquired cost-effectively.

As an alternative, the invention can also be structured such that manipulation, especially pulse signal adjustment, is initiated through a "Phase-Locked Loop" PLL. This also supports a circuit-related execution of the method.

For this option, the PLL is preferably used such that, for pulse signal adjustment done by the PLL, the pulse signal is sent to the system as an output signal from the PLL.

If the pulse signal adjustment affects the frequency of the pulse signal, the activity of the adjusted (sub)system is immediately influenced. This is also true for the speed of the adjustment.

In particular, if an exceptional degree of freedom is desired and cannot be accomplished just using circuits, a further embodiment of the invention wherein manipulation of the system is controlled by at least one process, and that process is carried out in a part of the system that is always active, is especially advantageous because it not only offers the aforementioned degree of freedom but also, because it is carried out in a part that will never be wholly or partially deactivated, ensures that parts which can be deactivated do not have to be kept active in order to carry out that process.

In one further embodiment, the manipulation can advantageously be performed using parameters and can even allow for the reaction to the gradient value to be preset. Here, for example, user entries to accommodate individual preferences or technical requirements can be made and/or can be adjusted at a later point in time.

If the manipulation generates an outgoing signal such that devices external to the system are manipulated, the effect based on the invention can be transferred advantageously to them without changing any existing systems.

The invented arrangement for operating an electronic system is structured such that means are provided for executing the method according to one of the preceding method claims, and that it produces and supports the advantages of the invented method and its further embodiments.

In an advantageous further embodiment of the arrangement, these means at least partially consist of highly integrated circuitry. This allows the invented method to be applied to electronic systems in a space-saving, highly efficient, and if used with mass production, exceptionally cheap fashion.

Additional advantages and details about the invention are further explained using the exemplary embodiments of the invention shown in the following FIGS. 1 and 2.

DETAILED DESCRIPTION OF THE INVENTION

The exemplary embodiment of the invented method described below exclusively or predominantly uses hardware (HW) implementations for controlling or adjusting energy-saving operating statuses.

This provides significant advantages that will be discussed later in more detail.

As an alternative or addition, this can be supported by a suitable software implementation. This is especially relevant when the control or adjustment is to be made predominantly but not exclusively.

As already explained, the implementation of the invented method shown in the figure is based on the physical characteristic of electronic systems that, at a given current voltage and given pulse frequency, the current consumption increases with increased system activity.

This characteristic is based on the fact that with increased activity a greater number of sub-function units are activated, so that power is required to operate capacitive comparable circuit-related elements such as function units in CPUs, memory cells in memory units, bus systems, etc.

The invention is characterized in that the absolute magnitude of this increase and the time-related curve are dependent upon the specific implementation. In practically all cases, however, the underlying relationship offers a usable indication of the activity curve, so that the invention can be implemented advantageously in nearly all electronic systems.

The principle of the exemplary embodiment shown in the figure is that it measures the current power consumption of a (sub)system and determines the curve for the power gradient using time-related differentiation of the signal adjusted to the hardware circuitry according to the invention.

This gradient is then used to control or adjust the system with respect to power consumption, using HW circuitry according to the invention, either by activating or deactivating control signals or, in particular, by adjusting the pulse frequency.

A positive gradient thus leads to an increase, and a negative gradient to a reduction, in the pulse frequency of the (sub)system.

The following describes a practical circuitry-related example of the embodiment of the invented method previously explained in principle.

For purposes of the overview, the representation is limited to adjusting pulse frequencies. It is, of course, also possible to control or adjust other or additional applicable parameters influencing power consumption. This is especially relevant when function units are configured to allow adjustments by means of register entries.

Figure 1:
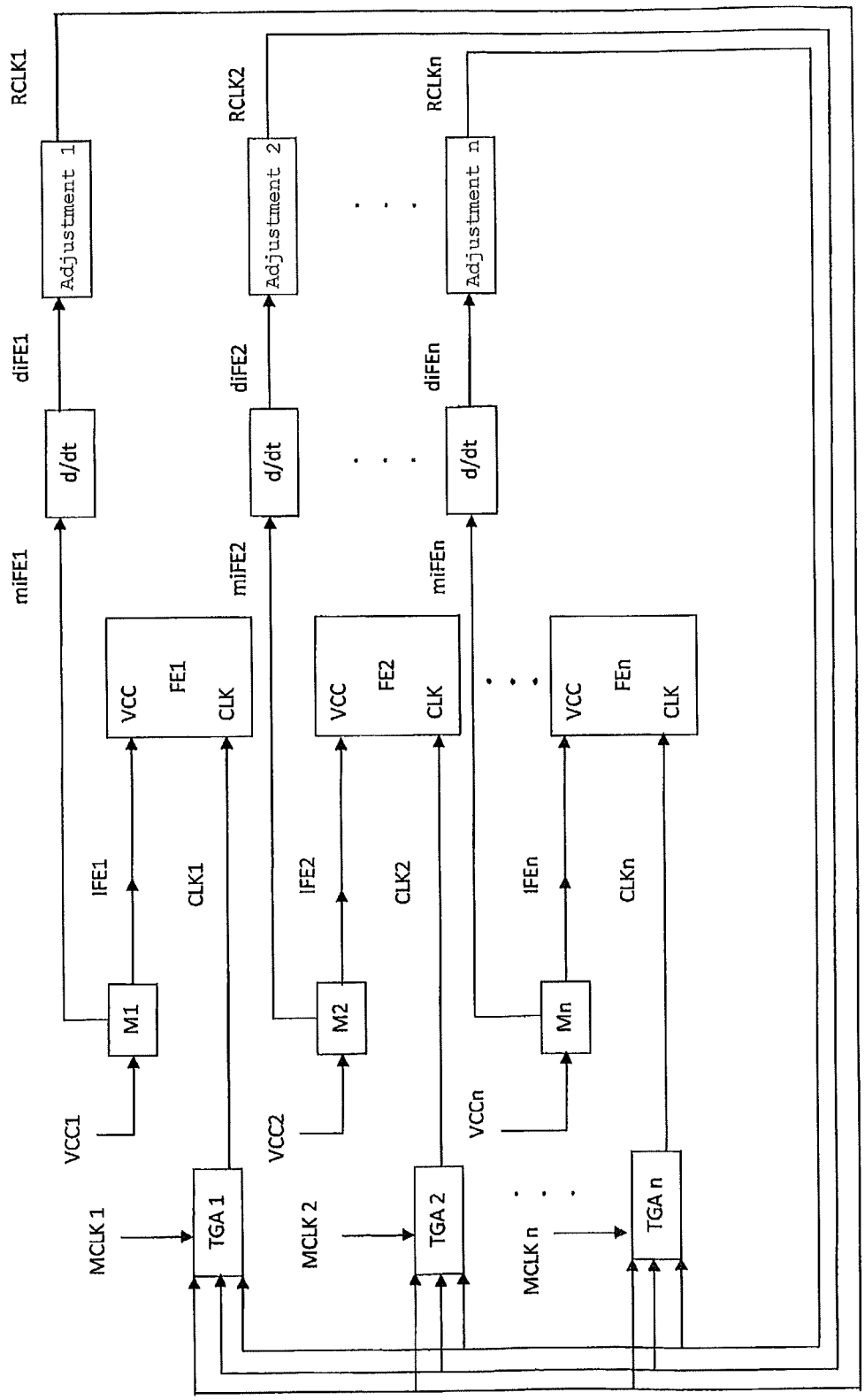
FIG. 1 shows an example of an electronic system using the invented method.

In the example in FIG. 1, function units FE1 to FEn (sub)system are shown, and the function units FE1 to FEn of an electronic system according to the exemplary embodiment are supplied from voltage sources VCC1 to VCCn.

Clock pulses supplied at a given time are represented in the figure by signals CLK1 to CLKn.

The power consumption at a given time is represented in the figure by signals IFE1 to IFEn of the exemplary embodiment. The respective power consumptions are measured according to the invention. This takes place in a unit designated as Block M in the drawing.

In a subsequent step, power consumption is differentiated as a function of time, and power gradients diFE1 to diFEn are determined using the time-related differentiation of measurement values miFE1 to miFEn.

Next these are used for adjustment settings ADJUSTMENT1 ... ADJUSTMENTn, which then generate adjustment signals RCLK1 to RCLKn, which in turn, together with master pulses MCLK1 to MCLKn in pulse generator units TGA1 ... TGAn, adjust the supplied pulses (pulse signals) CLK1 to CLKn.

It should further be noted that, in the exemplary embodiment, all adjustment signals are interconnected with all pulse generator units, so that interdependencies between function units can be taken into account and used advantageously.

Figure 2:
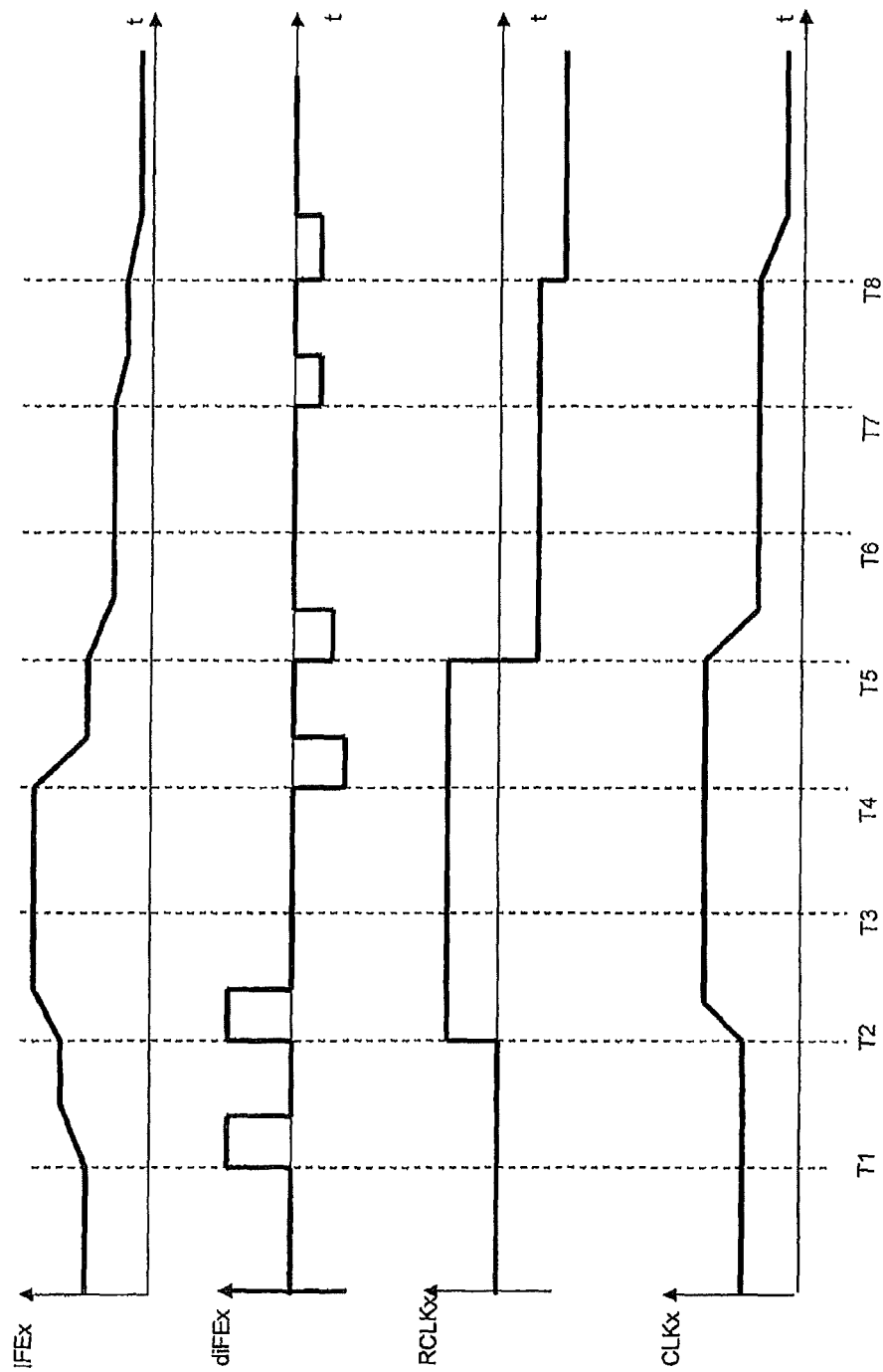
FIG. 2 shows examples of the slope curves for some signals related to the invention.

FIG. 2 shows a schematic example of the dependency between a previously described power consumption IFEx, a power gradient diFEEx determined from it, the generated adjustment signal RCLKx, and the resulting pulse supply signal CLKx.

The thought process for the invention is explained again here. It must first be known that, at a first point in time T1, the power consumption of the system increases because of the increased activity. Next, according to the invention, in combination with a corresponding adjustment specification, which is an implementation detail developed depending on the requirements of the electronic system to be adjusted according to the invention, i.e., optimized or adjusted by simulations, an adjustment signal is generated from the positive gradient and, through the pulse generator unit at a second point in time T2, leads to a defined increase in the pulse supply frequency.

In this case, the increase in power consumption IFEx, shown in the figure, between the second point in time T2 and a third point in time T3, caused by the increase in pulse signal frequency due to the adjustment and corresponding to the adjustment specification given for the circuits in the example, is ignored.

At a fourth point in time T4, however, activity is reduced to a negative power gradient diFEx, which by means of the adjustment and the pulse generator unit leads to a defined reduction in pulse frequency CLKx at a fifth point in time T5. The resulting reduction in power consumption IFEx, which can be seen in the figure and occurs between the fifth point in time T5 and a sixth point in time T6, is also ignored per the adjustment specification issued.

A reduction in power consumption IFEx caused by the repeated reduction in system activity at a seventh point in time T7 causes the pulse frequency to drop again. In this example, that reduction is smaller than the one at the fifth point in time T5; the frequency change (like the adjustment process in general) can be adapted to the given system by means of the adjustment specification.

The practical technical implementation of the described function units can take place in a variety of ways and depends greatly on the type of system.

In the context of communication terminals, implementation is assured by means of A/D converters, in particular for power consumption and also for implementing the adjustment and the pulse generator unit in an FGPA, with direct pulse output or combined with a PLL, for example.

The costs for this implementation are negligible compared to the potential savings. In certain applications, it is also possible for the adjustment to be made not by HW, but rather by software, as part of a function unit that is always active for other reasons, for example.

Furthermore, it is also possible for the invented method to be integrated advantageously into highly integrated components, especially in the context of embedded systems. In addition to managing function blocks internal to components, external blocks can also be controlled by providing the corresponding resources. In this case, the adjustment specification can be configured flexibly using corresponding parameterization options.

An important advantage of the method described here is that, unlike software-driven approaches, power consumption is optimized using only hardware. This means, in particular, that there is no need for software to be "aware" of the underlying hardware architecture, nor does any corresponding implementation have to be made in the software.

This is especially advantageous when, as is typical of embedded systems, there are often multiple function units/computer units without a specific operating system or scheduler concept.

Furthermore, programs for which there are no available source codes are often used in embedded systems, so that adapting them is very difficult or impossible. In addition, a software-controlled set-up assumes that at least one unit will remain in operation in order to make the adjustment.

The method described here in principle allows very complex adjustment mechanisms; in most application cases, however, relatively simple implementations are adequate for achieving a large portion of the potential savings, as shown in the following example of using the invention in a (communication) terminal.

An important advantage of the method lies in the fact that its effectiveness is ensured even if "periodic" activities of a system, such as polling interrupts, database updates, file system cleaning, etc., are performed relatively often, such as in periods of seconds or minutes, because the invented adjustment is made in a matter of milliseconds.

For further illustration of the invented method, further advantages, and a suitable system, its application in a cabled communication terminal should be explained as an example, without reference to a drawing. In this case it is clear that the method's use is not limited to this application case, but rather that it can be used in principle in all electronic systems.

The suitable system here consists of terminals from the OpenStage family from Siemens Enterprise Communication Networks, which are distinguished essentially by their network technology (Time Division Multiplex "TDM" or Internet Protocol IP based), and by their Man-Machine Interfaces (MMI) and available functionality with respect to applications.

In addition to function units that are common to all machines but partially differently implemented, such as data interfaces, keyboards, displays, or voice processing, there are functions that are entirely different, such as an Ethernet switch which is available only on IP-based devices in the OpenStage family, for example.

In normal operation at the time of the invention, these devices would therefore have different power consumption values ranging from 2 W to 15 W. Over the lifespan of the product, the operating costs for power would add up to a large portion of the device's costs.

In the specific case of the aforementioned terminals, it is sufficient to distinguish two operating statuses in order to achieve a large portion of the energy-saving potential: active status and standby status. Active status occurs during calling and speaking (with and without hands-free operation), and the remaining time is designated as standby status. Standby status accounts for about 95% of normal operating values. The goal in this case, therefore, is not to optimize the active status, but rather to reduce power consumption during standby status to a minimum.

This can be done very easily and efficiently using the invented method. In standby status it is sufficient to reduce system computing performance and interface functionality to the extent that merely recognition of incoming requests to the device, such as a key stroke or message notification through a data interface, is adequate. The increased power consumption in response to such requests is controlled by the adjustment according to the invention such that maximum pulse frequencies are reached immediately, in order to ensure optimum computer performance of the system and the fastest possible reaction times. In this case, the adjustment according to the invention is preferably configured so that when power consumption decreases, pulse frequencies are gradually reduced, in order to ensure that computer performance does not drop off completely until standby status is definitively reached. In this application case, a very simple adjustment is sufficient.

The method is also especially advantageous in that the various software programs implemented in the devices in different variations and versions do not have to be involved in the process; in other words, the necessary computer performance is "automatically" available at any point in time, while at the same time the average power consumption is reduced to a fraction.

The invention claimed is:

1. A method for operating an electronic system, through adjusting power consumption of at least parts of the system, the method comprising:

generating at least partially by circuitry, based on at least one time-related current curve detected within the system, a first gradient value for an electrical current value determined from the current curve detected within the system, the first gradient value being a value corresponding to a slope of the current curve detected within the system, the first gradient value indicating an increase to power consumption when the first gradient value is a positive value and indicating a decrease in power consumption when the first gradient value is a negative value;

based on the first gradient value, manipulating through circuitry at least one physical parameter of the system to reduce power consumption of the system when the first gradient value is the negative value and increase power consumption of the system when the first gradient value is the positive value.

2. The method of claim 1, wherein the first gradient value is generated entirely by the circuitry, the circuitry being comprised of only hardware, and wherein the manipulating of the at least one physical parameter based on the first gradient value is performed entirely by circuitry and comprises adjusting at least one pulse signal generated by at least one pulse generator unit, the at least one pulse signal being adjusted from a first frequency to one of a second frequency and a third frequency, the second frequency being a frequency that is greater than the first frequency and the second frequency being a frequency that is greater than the third frequency and the third frequency being a frequency that is less than the first frequency and the third frequency being a frequency that is less than the second frequency; and wherein adjustment of the at least one pulse signal to the second frequency causing an increase in power consumption and adjustment of the at least one pulse signal to the third frequency causing a decrease in power consumption; and wherein the adjusting at least one pulse signal generated by at least one pulse generator unit is performed such that the at least one pulse signal is adjusted to the second frequency when the first gradient value is positive to increase power consumption and the at least one pulse signal is adjusted to the third frequency when the first gradient value is negative to reduce power consumption.

3. The method of claim 2, comprising directing the electrical current value through an analog-digital converter ("A/D converter") to form an output signal from the A/D converter and generating the first gradient value from the output signal from the A/D converter.

4. The method of claim 2, wherein the adjustment of the frequency of the at least one pulse signal is initiated by a Field-Programmable Gate Array (FPGA).

5. The method of claim 4, wherein the FPGA forwards the at least one pulse signal as at least one outgoing signal from the FPGA to the system.

6. The method of claim 2, wherein adjustment of the frequency of the at least one pulse signal is initiated by a "Phase-Locked Loop" (PLL).

7. The method of claim 6, comprising, sending the at least one pulse signal to the system as an output signal from the PLL.

8. The method of claim 2, wherein frequency of the at least one pulse signal is changed in accordance with an adjustment specification.

9. The method of claim 1, comprising controlling the manipulation of the at least one physical parameter of the system through at least one process, wherein the process is performed in a continuously active part of the system.

10. The method of claim 1, comprising configuring the manipulation to set a reaction to the first gradient value.

11. The method of claim 1, wherein the manipulation prepares an output signal for manipulating at least one device outside the system.

12. An arrangement for operating an electronic system, comprising an electronic system comprising a display, a power supply, and circuitry for executing the method of claim 1.

13. The arrangement of as in claim 12, wherein the circuitry of the electronic system comprises highly integrated circuitry.

14. The method of claim 1, comprising creating at least one adjustment signal based on the first gradient value, each of the at least one adjustment signal interconnected with pulse generator units affecting adjustment of the at least one pulse signal so that interdependencies between function units of the system are taken into account.

15. The method of claim 1, wherein the generating of the first gradient value is done only by circuitry and does not utilize software to implement the generation of the first gradient value.

16. The method of claim 1, wherein the first gradient value is generated by determining a time-related differentiation of a signal, the signal for detecting the at least one time-related current curve detected within the system.

17. The method of claim 1, further comprising:
measuring power consumption of the electronic system from at least one signal;
differentiating as a function of time the measured power consumption; and
wherein the first gradient value is generated by using time-related differentiation of measurement values from the measured power consumption of the electronic system.

18. The method of claim 17, wherein the manipulating through circuitry of the at least one physical parameter is performed entirely through circuitry, the circuitry being comprised of only hardware, and the manipulating of the at least one physical parameter of the system to reduce power consumption of the system when the first gradient value is the negative value and increase power consumption of the system when the first gradient value is the positive value comprises:
adjusting at least one pulse signal from a first frequency to one of a second frequency and a third frequency, the second frequency being a frequency that is greater than the first frequency and the second frequency being a frequency that is greater than the third frequency, the third frequency being a frequency that is less than the first frequency and the third frequency being a frequency that is less than the second frequency; and
wherein adjustment of the at least one pulse signal to the second frequency causing an increase in power consumption and adjustment of the at least one pulse signal to the third frequency causing a decrease in power consumption; and
wherein the adjusting at least one pulse signal is performed such that the at least one pulse signal is adjusted to the second frequency when the first gradient value is positive to increase power consumption and the at least one pulse signal is adjusted to the third frequency when the first gradient value is negative to reduce power consumption.

19. The method of claim 18, wherein the at least one pulse signal is adjusted via at least one pulse generator unit.

20. The method of claim 18, wherein the adjustment of the at least one pulse signal to the third frequency causing a decrease in power consumption to occur and the at least one pulse signal is subsequently adjusted entirely via the circuitry to a fourth frequency that is lower than the third frequency to further reduce power consumption of the electronic system and adjusts the electronic system from a first status to a second status that requires less power than when the system is in the first status.

* * * * *